Nov. 16, 1937.  E. NUEBLING  2,099,139

WATER METER

Filed March 22, 1935  4 Sheets-Sheet 1

INVENTOR.
EDWARD NUEBLING
BY
ATTORNEYS.

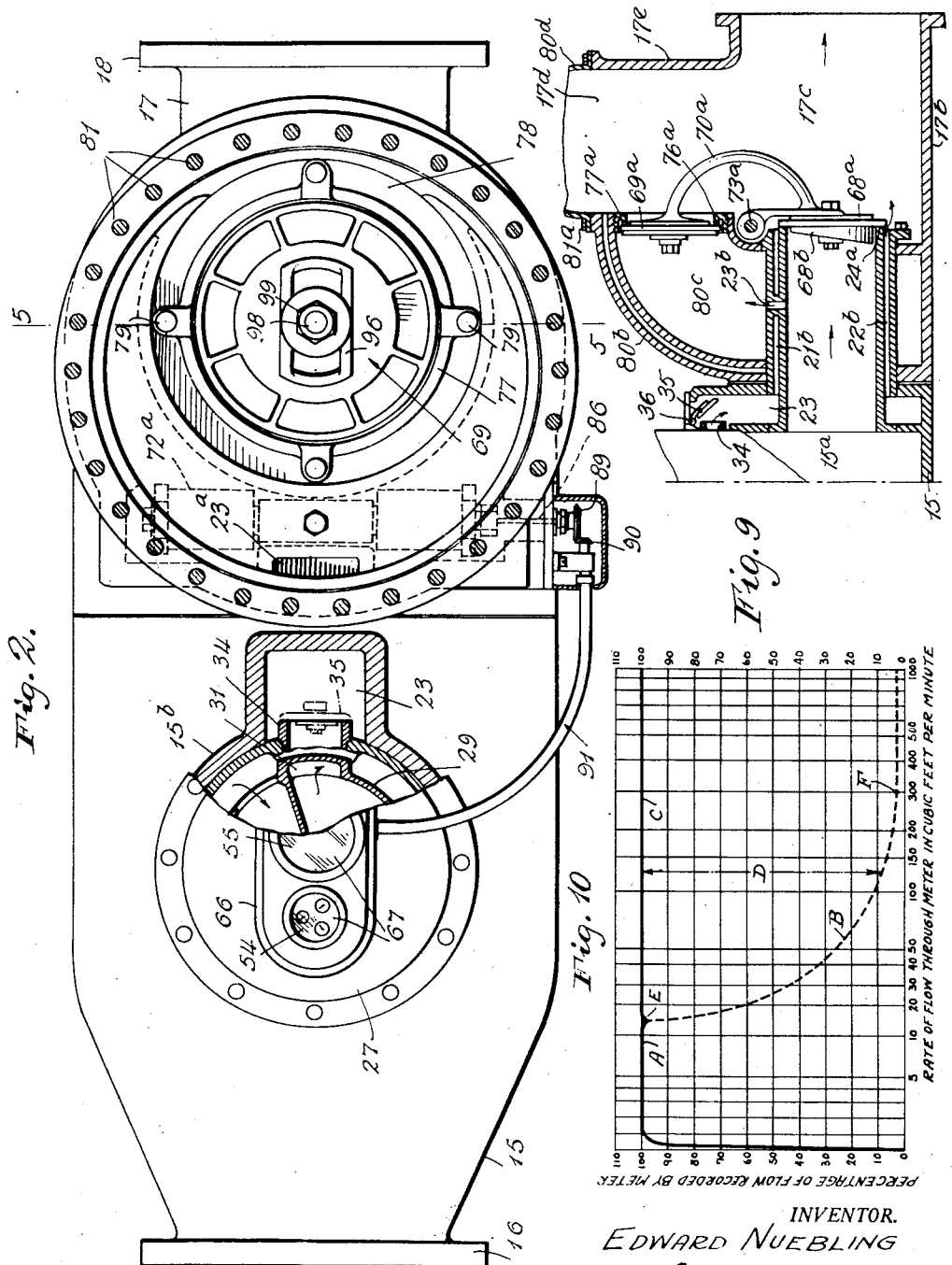

Nov. 16, 1937.  E. NUEBLING  2,099,139
WATER METER
Filed March 22, 1935  4 Sheets-Sheet 3
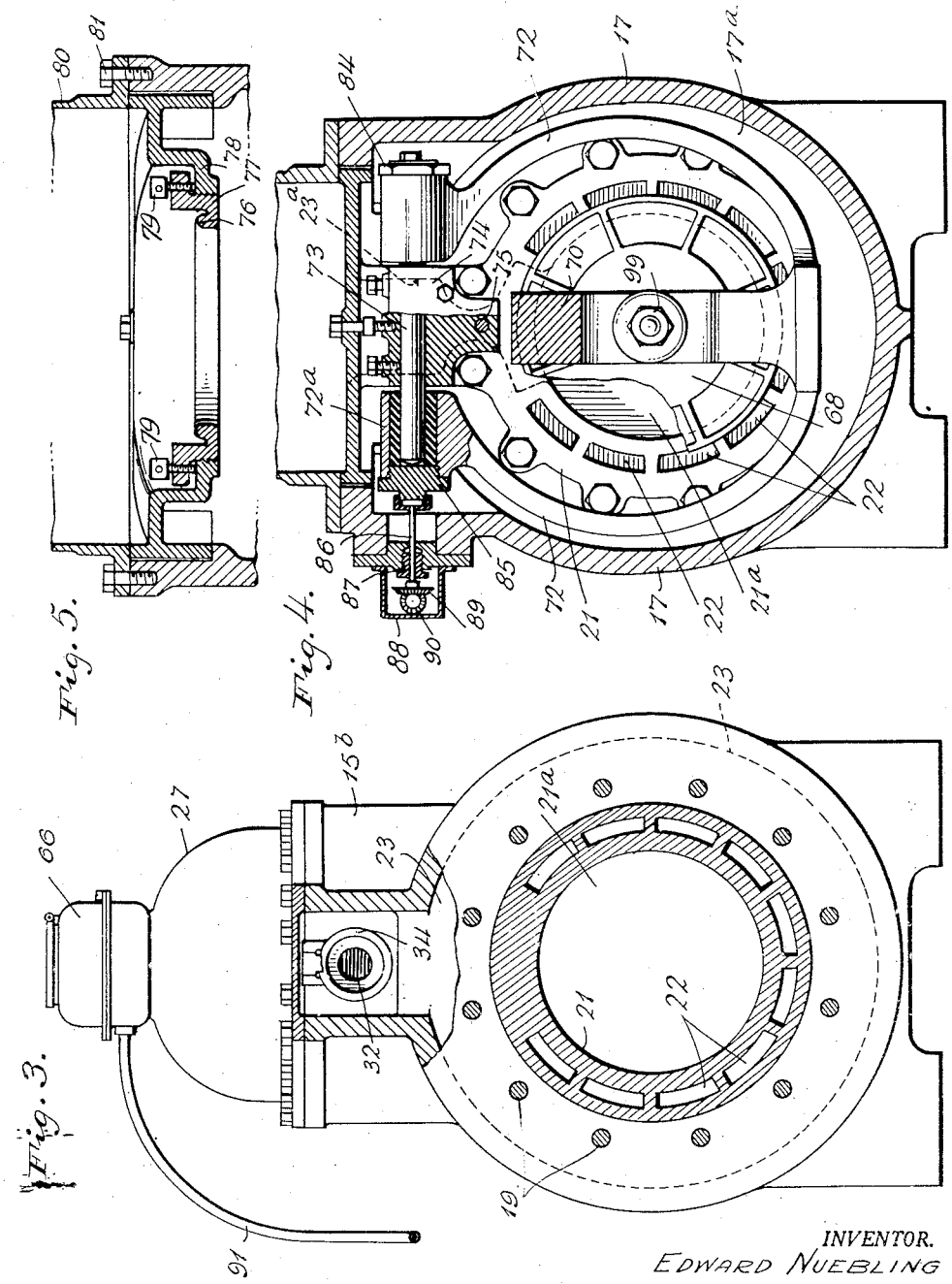
INVENTOR.
EDWARD NUEBLING
BY
ATTORNEYS.

Nov. 16, 1937.   E. NUEBLING   2,099,139
WATER METER
Filed March 22, 1935   4 Sheets-Sheet 4

INVENTOR.
EDWARD NUEBLING
BY
ATTORNEYS.

Patented Nov. 16, 1937

2,099,139

UNITED STATES PATENT OFFICE 2,099,139

WATER METER

Edward Nuebling, New York, N. Y.

Application March 22, 1935, Serial No. 12,372

3 Claims. (Cl. 73—203)

The invention relates to water meters and more particularly to that type thereof commonly referred to as fire-service meters adapted to measure the quantity of water supplied to sprinklers and other systems intended to be used for the extinguishing of fires. Although water may rarely be required for the purpose of extinguishing fires, experience nevertheless has demonstrated that if a fire-service supply is not metered, leakage and improper use, with few exceptions, result in large and material losses.

In order that all flows likely to pass through a meter of the indicated type may be properly measured, it is essential that the meter operate accurately over a wide range in the rates of flow. Furthermore, when during fire emergencies or for other reasons the fire-service system is required to deliver large quantities of water for fire fighting or other purposes, it is essential that the meter permit a free and maximum flow of water through it without obstruction and without appreciable loss of pressure head.

The principal object of the present invention is to provide a novel and improved meter of the indicated class which will function with maximum accuracy at all rates of flow through the meter.

The invention further contemplates the provision of a meter of the type under discussion which is of simple and durable construction, capable of being sold at relatively low cost and of withstanding long periods of service without frequent attention, adjustments or repairs.

Other more specific objects will appear from the description hereinafter and the features of novelty will be pointed out in the claims.

Figure 1:
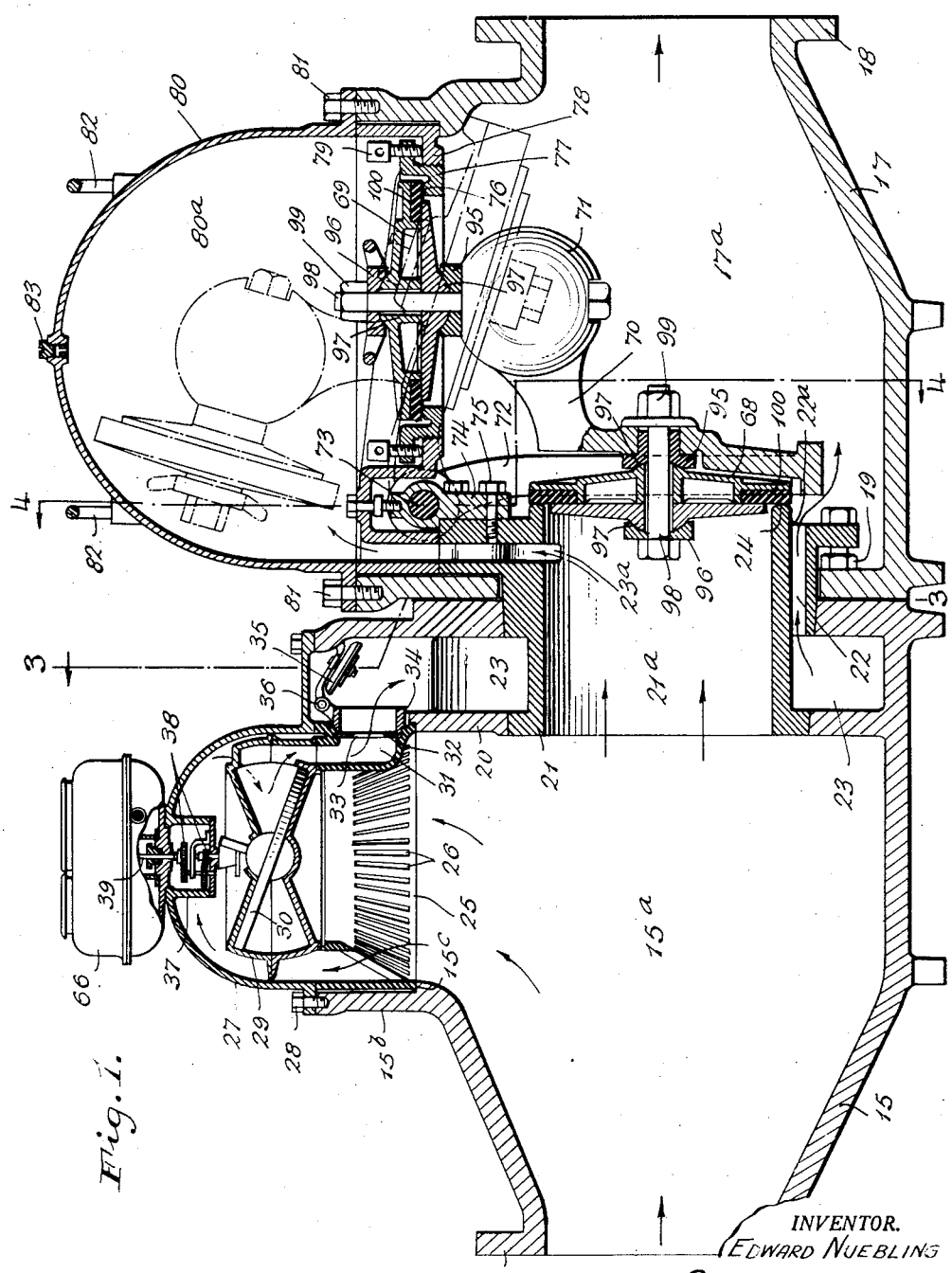
Figure 6:
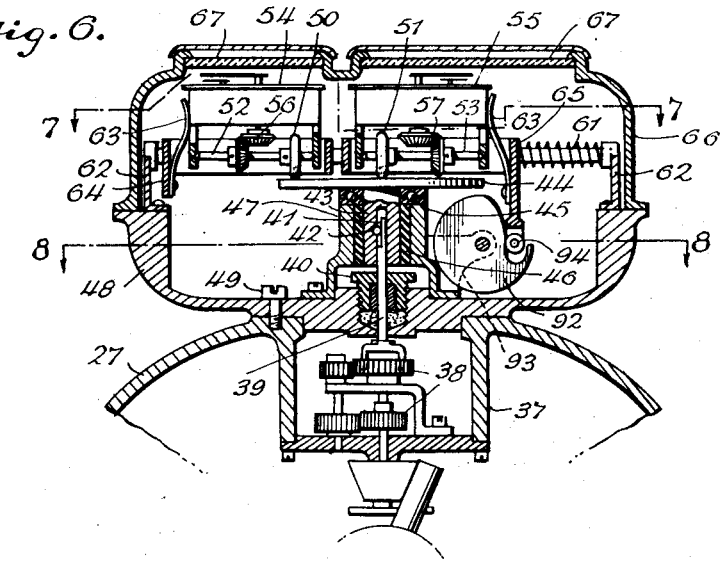
Figure 7:
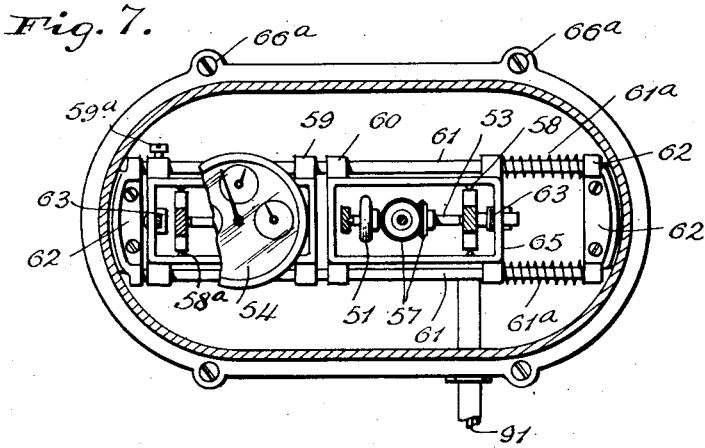
Figure 8:
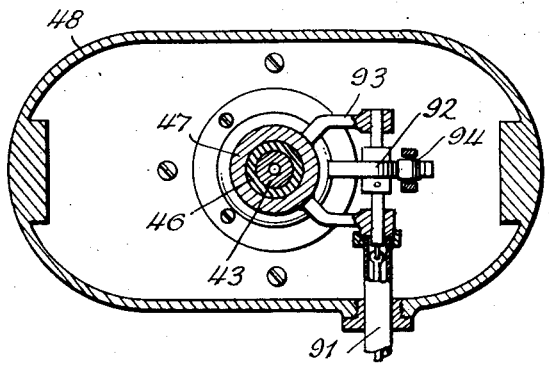

In the accompanying drawings which illustrate examples of the invention without defining its limits, Fig. 1 is a sectional elevation of one form of the novel meter; Fig. 2 is a plan view thereof with parts in section; Fig. 3 is a cross section on the line 3—3 of Fig. 1; Fig. 4 is a fragmentary cross section on the line 4—4 of Fig. 1; Fig. 5 is a fragmentary sectional view on the line 5—5 of Fig. 2; Fig. 6 is a detail sectional elevation on an enlarged scale showing the measuring apparatus forming part of the meter; Fig. 7 is a horizontal section on the line 7—7 of Fig. 6; Fig. 8 is a horizontal section on the line 8—8 of Fig. 6; Fig. 9 is a fragmentary sectional elevation of another form of the invention; and Fig. 10 is a diagram showing the registration corresponding to different rates of flow through the novel meter.

As shown in Fig. 1 of the drawings, the meter includes a casing preferably consisting of an inlet section 15 provided with a flanged inlet 16 adapted for connection with a conduit leading to a source of supply, and an outlet section 17 terminating in a flanged outlet 18 arranged to be connected with an outlet pipe in which a control valve may be located in the customary manner; the casing sections 15 and 17 are connected with each other at their opposed flanged ends in any convenient manner as by means of bolts or the like 19. The sections 15 and 17 are preferably of cylindrical shape and of dimensions suitable to the purpose for which they are designed. The inlet section 15 is provided with an internal partition 20 having an aperture in which the one end of a throat-piece 21 is suitably mounted, said throat-piece extending through suitable openings in the opposed ends of the sections 15 and 17 and serving to connect the inlet chamber 15ᵃ of the section 15 with the outlet chamber 17ᵃ of the section 17. The throat-piece as shown is provided with an internal axial passage 21ᵃ and with by-pass channels 22 which preferably are located exteriorly about said passage 21ᵃ and establish communication between a passage 23 formed by the partition 20 in the section 15 and the outlet chamber 17ᵃ of the section 17, as illustrated. The throat-piece 21 further includes an outwardly directed passage 23ᵃ the purpose of which will appear more fully hereinafter, and has its right hand end in Fig. 1 formed with a preferably rounded or curved valve seat 24 located in the outlet chamber 17ᵃ of the section 17.

An annular member 25 provided with slots 26 is accurately fitted into the upwardly projecting portion 15ᵇ of the section 15 and rests upon an annual shoulder 15ᶜ formed therein; the annular member 25 is fixed in place in any convenient manner as for instance by means of an upper casing member 27 which itself is secured in position by means of bolts or the like 28. The slotted annular member 25 serves as a screen and a support for the measuring chamber 29 which contains the measuring piston 30; in the form shown in the drawings the latter is of the well-known nutating disc type, it being understood however that this type of piston 30 may be replaced by any other equivalent means for effecting the desired measuring results. The annular slotted member 25 is further provided with an outlet port 31 which leads to the passage 23 and is provided at its exit end with an orifice plate 32 provided with an opening 33 of predetermined size and held in place for instance by means of a collar 34, as shown in Fig. 1, said collar 34 being screwed into or otherwise removably mounted in the outlet port 31. A check valve 35 of suitable type is pivotally mounted at 36 upon the collar 34 and is adapted to co-operate with the latter to prevent back flow through the measuring chamber 29.

The upper casing member 27 is provided internally with an enclosed chamber 37 in which is mounted a reduction gearing 38 which is arranged to be operated by the measuring piston 30 shown in Fig. 1, and which drives a shaft 39 extending vertically through a suitable stuffing box 40 externally of the meter and into operative connection with the measuring or totalizing means as illustrated in Fig. 6 whereby the flows passing through the meter are properly measured. In the illustrated example, as shown best in Fig. 6, the shaft 39 is provided with a flattened reduced end 41 which engages a driving pin 42 mounted in the projecting end or shaft 43 of a friction disc 44. The disc 44 is rotatably mounted preferably on ball bearings 45 and its shaft 43 is arranged to rotate in a bushing 46 which is preferably made of self-lubricating material such as metalized graphite and is fitted in an upright bearing 47 mounted within a casing 48 which itself is fixed in place upon the upper casing member 27 for instance by means of screws 49 or their equivalent.

The friction disc 44 is arranged to drive two friction wheels 50 and 51 mounted respectively upon shafts 52 and 53, the latter being rotatably mounted preferably by means of conical pivot-bearings in posts depending from the bottom plates of registers or totalizers 54 and 55 respectively. The shafts 52 and 53 are connected by suitable bevel gears 56 and 57 with the actuating mechanisms of the totalizers 54 and 55 which operate in any customary and well-known manner. The totalizers 54 and 55 including the shafts 52 and 53 are free to pivot vertically as independent units about conical pivot bearings 58ª and 58 respectively, said pivot bearings 58ª and 58 being fixed on carriages 59 and 60 slidably mounted in horizontal directions on parallel guide rods 61 supported by brackets 62 mounted upon the casing 48 as illustrated in Fig. 6. Leaf springs 63 fixed upon members 64 and 65 of the carriages 59 and 60 respectively, bear against the totalizer units 54 and 55 and tend to pivotally actuate such totalizer units about the bearings 58 and 58ª in directions to press the friction wheels 50 and 51 into engagement with the upper surface of the friction disc 44 with just sufficient force to keep said friction wheels 50 and 51 at all times in proper operative engagement with the disc 44. To protect the totalizing means and associated elements, a suitable cover 66 is removably fixed upon the casing 48 in any convenient manner for instance by means of screws 66ª, said cover 66 being provided with sight openings closed by glass or other transparent sections 67 in vertical registry with the totalizers 54 and 55.

With the arrangement illustrated and described it is obvious that any movement of the meter piston 30 will be transmitted through the systems of gears and co-operating parts to the totalizers 54 and 55. In operation the meter piston 30 displaces or carries over a fixed quantity of liquid during each revolution, which movements of the piston 30 are translated by the aforesaid systems of gearing and co-operating elements into convenient units of measurement indicated by the totalizing means or mechanism such as cubic feet or gallons. The totalizing means or mechanism will indicate a true measurement of flow only when the meter has been properly calibrated by suitable gear adjustment. Because of tolerance allowed in machinery, no two meters are exactly alike and the aforesaid adjustment is based on an actual test made by passing a quantity of water through the meter, which quantity is measured either by discharging into a tank of known capacity or by weighing the amount of water discharged. In the instant construction the required adjustment either to calibrate the meter or to alter the readings of the totalizing means or mechanism may be readily effected by shifting the friction wheel 50 across the face of the disc 44. This may be accomplished by sliding the carriage 59 toward or away from the center of the disc 44 and then fixing said carriage 59 in its adjusted position on the guide rods 61 for instance by means of a set screw 59ª shown in Fig. 7. The purpose of the two totalizers 54 and 55 and their associated elements will be more clearly set forth hereinafter.

The meter further includes the novel duplex valve illustrated in the drawings and shown in detail in Fig. 1, which duplex valve overcomes objections found in hydraulic valves as heretofore constructed for the purpose of offering a definite resistance to the initial opening of the valve under liquid pressure and a reduced or negligible resistance once the valve has started to open.

The duplex valve under discussion in its illustrated form consists of a vertical flap member 68 and a co-operating horizontal flap member 69 both pivotally mounted at right angles to each other upon a carrier 70 which, if necessary or desired, may include a weight 71. The carrier 70 is mounted upon a support 72 hinged upon a horizontal rod 73 suitably fastened in a bearing bracket 74 secured to the throat-piece 21 for instance by means of bolts or the like 75. The flap member 68 is adapted to engage the preferably rounded seat 24 of the throat-piece 21 while the flap member 69 is arranged to engage a correspondingly rounded seat 76 for the purpose of controlling the flow through the axial passage 21ª which with the inlet chamber 15ª and outlet chamber 17ª constitutes the main line channel of the meter, the passage 21ª representing a constricted portion of such main line channel. The seat 76 constitutes part of a valve ring 77 which is adjustably threaded into a partition member 78 fitted into a recess formed in the upper portion of the casing section 17, said valve ring 77 being held in position by bolts 79; the partition member 78 is fixed in place in the aforesaid recess by means of a hood 80 mounted upon the aforesaid upper portion of the casing section 17 and secured in place thereon by screws or the like 81; the interior of the hood 80 constitutes a compartment 80ª which is separated from the outlet chamber 17ª by the partition member 78 and valve ring 77, communication between the compartment 80ª and the outlet chamber 17ª being controlled by the flap member 69 in co-operation with the valve seat 76. As shown in Fig. 1 of the drawings, the outwardly directed passage 23ª connects the main line channel 21ª with the compartment 80ª.

The valve ring 77 is threaded into the partition member 78 so as to be adjustable therein and to enable said valve ring 77 to be screwed upwardly against the flap member 69 so that a portion of the weight of the duplex valve may be carried by the valve ring 77 to thereby cause the flap member 69 to firmly seat itself upon the valve seat 76 to insure a tight closure of the valve. The hood 80 is preferably provided with one or more lifting handles 82 to facilitate the removal of said hood 80 when this is required or advisable, said hood 80 further being provided with an air relief valve 83 of conventional type for permitting air to escape from the compartment 80ª when water is first introduced into the same.

As shown in Fig. 4 the outer ends of the bearings 72ª whereby the support 72 is mounted on the rod 73 are internally threaded for the reception of thrust-bearing caps 84 and 85 which by engagement with the opposite ends of the rod 73 fix the duplex valve unit against lateral movement. A slender shaft 86 is detachably connected with the thrust-bearing cap 85 and extends horizontally in registry with the axis of the rod 73 through a suitable stuffing box 87 of the casing section 17 into an externally located gear box 88. The shaft 86 at its outer end carries a bevel gear 89 which meshes with a co-operating bevel gear 90 fixed upon one end of a flexible shaft 91, as shown in Fig. 2; the flexible shaft 91 extends into the casing 48 of the totalizing means into connection with a cam 92 journalled interiorly of said casing 48 on bearing brackets 93. It will be noted with this arrangement that any pivotal movements of the aforesaid duplex valve on the rod 73 will be transmitted through the flexible shaft 91 to the cam 92, the ratio of the bevel gears 89 and 90 being preferably three to one so that angular movements of the cam are three times as great as corresponding movements of the duplex valve about the rod 73. The cam 92 co-operates with a roller 94 rotatably mounted in the lower forked end of the member 65, as shown in Fig. 6; the purpose of this arrangement will appear more clearly from the description hereinafter.

To facilitate accurate seating of the flap members 68 and 69 on the seats 24 and 76 respectively, particularly in cases in which the pivot rod 73 is not in accurate true alignment, the flap members 68 and 69 are connected with the carrier 70 by means of ball and socket joints; the latter comprise recessed members 95 suitably mounted on the carrier 70 and opposed recess members 96, said recess members 95 and 96 being in engagement with curved projections 97 forming integral parts of the flap members 68 and 69. The latter and the elements comprising the ball and socket joints are secured in place upon the carrier 70 by bolts 98 and nuts 99 as clearly shown in Fig. 1. An additional advantage provided with the ball and socket connections of the flap members 68 and 69 with the carrier 70 resides in the fact that said ball and socket connections permit the use of annular line contact between the flap members 68—69 and the respective seats 24 and 76 thereof and eliminating the customary surface contact which often causes binding or sticking and prevents the valve from opening under the desired difference in pressure between the inlet and outlet sides of the valve. In the illustrated example the aforesaid line contact is secured by rounding the valve seats 24 and 76 as previously indicated. The line contact referred to has the further advantage that it permits the use of a copper or other suitable metal washer 100 on the flap members 68 and 69 for engagement with the seats 24 and 76 instead of the soft rubber washer heretofore generally employed for this purpose; in practice it has been found that the generally utilized soft rubber washers swell unevenly during use and permit unintentional leakage past the valve, which objection is entirely avoided with the illustrated construction. With the latter in actual service after the hinge or pivot bearings of the duplex valve become slightly worn, the flap members 68 and 69 are capable of automatically adjusting themselves by reason of the ball and socket connections with the carrier 70 to always maintain a uniform and efficient closure through the impact of the flap members 68 and 69 against the seats 24 and 76 when the valve closes.

In practice the operation is as follows: When there is no flow through the meter the flap members 68 and 69 are seated against the seats 24 and 76 by their own weight combined with that of the carrier 70 as indicated by full lines in Fig. 1, and all parts of the meter are under the same pressure. It is assumed that the meter is set in a pipe line with a suitable control valve in the outlet pipe connected with the outlet 18 of the section 17, and that a flow of water is started through the meter by the opening of this control valve which may be of any conventional form and has not been illustrated; this flow of water developed by the opening of the aforesaid valve through the meter will obviously be through the channels that offer the least resistance. As at this stage the flap members 68 and 69 of the duplex valve are in engagement with the seats 24 and 76 respectively, flow of water through the main line channel 15a, 21a, 17a will be prevented and the water at first flow will therefore pass through the chamber 29, the port 31 and by-pass channels 22 to the outlet chamber 17a as indicated by the arrows in Fig. 1.

Whenever the amount of water being used is such as to bring about a predetermined difference in the pressure conditions between the inlet chamber 15a and the outlet chamber 17a of say for instance four pounds to the square inch, the flap members 68 and 69 will be lifted from the seats 24 and 76 and a portion of the total flow will be diverted through the main line channel 15a, 21a, 17a, and the outwardly directed channel 23a. The flow through the channel 23a is negligible, this channel being intended merely to transmit the pressure head from the chamber 15a to the compartment 80a but being sufficiently large to prevent clogging. Increase of flow through the meter will cause the carrier 70 to pivotally swing on the rod 73 through increasing angular distances until the full open position is reached as indicated by dotted lines in Fig. 1.

As the valve opening increases, the proportion of total flow which passes through the by-pass channels 22 decreases with the result that with the valve in the full open position only a small percentage of said total flow will pass through such by-pass channels 22. With the valve full open the proportion of the total flow through the by-pass channels is determined by the ratio of the diameter of the throat-piece 21 to the diameter of the inlet chamber 15a and by the size of the by-pass channels 22; in the preferred construction the diameter of the inlet chamber 15a should preferably be at least twice the diameter of the throat-piece 21 so that an appreciable difference in pressure head will obtain between said inlet chamber 15a and the outlet chamber 17a at the outlet ends 22a of the by-pass channels 22. The arrangement of the by-pass channels 22 around the throat-piece 21, and the terminating ends thereof at said throat-piece 21, where the pressure drop is greatest, insures a maximum hydraulic efficiency and the diversion of a flow through the by-pass channels 22 sufficient to actuate the piston 30 when the flap members 68 and 69 are removed from their respective seats.

Because ordinary castings used in water-meter construction are as a rule not uniform, it is desirable to make the port 31 and the by-pass channels 22 of liberal dimensions and to introduce a controllable obstruction to the flow such as is illustrated by the orifice plate 32 illustrated in Fig. 1. By substituting plates 32 having openings of different dimensions, the pressure-head loss in the by-pass channels 22 may be modified and a greater or lesser proportion of the total flow diverted through the by-pass channels 22 when the flap members 68 and 69 are away from their seats.

Owing to the fact that when the flap members 68 and 69 of the duplex valve are seated upon the seats 24 and 76 respectively, the entire flow through the meter must pass through the by-pass channels 22 and that when said duplex valve is open, only a portion of such flow passes through said by-pass channels 22, it is apparent, unless special provisions are made as will appear hereinafter, that a single totalizer fixed in position and geared to show a quantity of water passed through the meter when the entire flow is through the by-pass channels 22, would, when the duplex valve is in its open position, register only a proportionate part of the flow passing through the by-pass channels 22. In order therefore that accurate registration of all flows through the meter may be obtained, two totalizers 54 and 55 such as shown in the illustrated example are employed. The one totalizer 54 is fixed in position by the set screw 59$^a$ and is geared to register the total flow through the meter when the flap members 68 and 69 are seated. The other totalizer 55 is geared to register the difference between the total flow, when the duplex valve is in the full open position, and the flow registered by the totalizer 54. The registration of intermediate flows is accomplished by means of the cam 92 which acts on the roller 94 in dependence upon the pivotal movements of the duplex valve, and by moving the carriage 60 on the rods 61 shifts the friction wheel 51 across the face of the disc 44 in such manner that the sum of the readings of the totalizers 54 and 55 indicates the total flow through the meter. As shown in Fig. 6 when the duplex valve is seated, the friction wheel 51 is located at the center of the disc 44 and is held in this position by means of springs 61$^a$ and the roller 94 which bears against the periphery of the cam 92. Obviously, when the friction wheel 51 is located at the center of the disc 44, the motion of the latter will not be transmitted to the totalizer 55 but for any given rotative speed of said disc 44 the farther away from the center of the disc that the friction wheel 51 is shifted, the greater will be the speed of the counter gears and the greater will be the indication of the totalizer 55, so that any desired percentage registration of total flow can be obtained by providing the cam 92 with suitable outline.

Fig. 10 shows typical curves for a meter constructed in accordance with the principles of the instant invention. In the diagram illustrated in this figure the curves A and B show the percentage of the total flow registered by the totalizer 54. For all rates of flow up to the point E, when the duplex valve begins to open, the entire flow through the meter is registered by said totalizer 54. From the point E to the point F which is the point at which the duplex valve reaches its fully open position, the totalizer 54 registers decreasing percentages of the total flow and from the point F to the capacity of the meter said totalizer 54 registers uniformly a given small percentage of said total flow. The ordinate D in the diagram of Fig. 10 represents the percentage of the total flow registered by the totalizer 55 between the points E and F, the varying percentages being obtained by the action of the cam 92 which causes the friction wheel 51 to be moved across the face of the disc 44. For all rates of flow from the point F to the capacity of the meter the totalizer 55 registers the uniform percentage difference between the total flow and the flow registered by the totalizer 54. It will be seen that for any given rate of flow through the meter, the sum of the readings of the two totalizers 54 and 55 will give the total flow through the meter as represented by the curves A and C in Fig. 12.

In order that the principles which govern the automatic functioning of the duplex valve of the illustrated meter may be better understood, the following description is added:

When there is no flow through the meter, the duplex valve is seated by its own weight which is divided between the two valve seats 24 and 76. The forces acting on the duplex valve and tending to swing it about the horizontal rod 73 are the forces resulting from the different intensities of water pressure acting on the flap members 68 and 69. When the duplex valve is seated, the intensity of the pressure acting on inlet side of the flap member 68 is the same as the intensity of pressure in the chamber 15$^a$ and the total pressure acting on the duplex valve is the intensity of pressure multiplied by the area within the valve contact-circle. The effect of the total pressure is the same as a single force applied at the center of the flap member 68 acting in a horizontal counter-clockwise direction and tending to open the duplex valve by swinging it on its pivot or hinge. The intensity of pressure acting on the outlet side of the flap member 68 is the same as the intensity of pressure in the chamber 17$^a$, and the total pressure acting on the outlet side of the valve is the intensity of pressure in the chamber 17$^a$ multiplied by the area within the valve contact-circle. The effect of this total pressure is the same as a single force applied at the center of the flap member 68 acting in a horizontal clockwise direction and tending to close the valve by turning it on its pivot or hinge. When there is no flow through the meter, the intensity of pressure in the chamber 15$^a$, which acts on the inlet side of the flap member 68, is the same as the intensity of pressure in chambers 17$^a$, which acts on the outlet side of said flap member 68, and consequently the force on the inlet side on the flap member 68 corresponds to the force on the outlet side thereof, which two forces being equal and opposite in direction therefore neutralize each other. As water passes through the by-pass channels 22, because of the opening of a control valve on the outlet side of the meter, resistance is produced by fluid friction and an amount of head is used up that is proportional to the velocity of the flow. Consequently, the intensity of the pressure in the chamber 17$^a$ becomes less than the intensity of pressure in the chamber 15$^a$ and the two opposing forces acting on the flap member 68 are therefore unequal. The difference between the two forces or in other words "the resultant force" acts in a counter-clockwise direction and tends to open the duplex valve. This resultant force may be determined by multiplying the difference between the pressures in 15$^a$ and 17$^a$, or "differential pressure" by the area within the contact circle. The moment of the resultant force with respect to the center of the hinge or rod 73 is the product of the magnitude of the force and the perpendicular distance or "lever-arm" between the force and said center of the hinge.

The differential pressure acting on the horizontal flap member 69 is the same as the differential pressure effective on the vertical flap member 68 but the resultant force acts in a clockwise direction tending to close the duplex valve. The moment of the vertical resultant force with respect to the center of the hinge depends upon the area within the contact circle and the length of the lever-arm; it must be made less than the moment of the horizontal force.

The weight of the valve has substantially the same effect in tending to close it as a single vertical force equal to the combined weight of the flap members 68 and 69 and the carrier 70 passing through the center of gravity of the mass, and the moment of this force with respect to the center of the hinge is the product of the magnitude of the force and the perpendicular distance between the force and the center of the hinge.

It is apparent from the foregoing that the horizontal force acting on the duplex valve tending to open it is opposed by the two vertical forces tending to close it. The relation between the several forces acting on the valve may be expressed by the formula:

$$PAL_a = PBL_b + WL_w$$

In which:
$P$ = Difference between pressure in chamber 15$^a$ and 17$^a$, or the "differential pressure";
$A$ = Area within vertical valve-seat ring;
$L_a$ = Lever arm $a$, or perpendicular distance between horizontal line through center of vertical flap and center of valve-hinge;
$B$ = Area within horizontal valve-seat ring;
$L_b$ = Lever arm $b$, or perpendicular distance between vertical line through center of horizontal flap and center of valve hinge;
$W$ = Combined weight of valve flaps and carrier in water;
$L_w$ = Lever arm $w$, or perpendicular distance between vertical line passing through center of gravity of valve mass and center of valve hinge.

$PAL_a$, $PBL_b$ and $WL_w$ are the moments of the resultant forces with respect to the center of the valve hinge.

Numerical values for a valve suitable for a meter having a throat-piece of 12 inches internal diameter, and a vertical valve-seat-ring which is 12.5 inches in diameter would be as follows:

$P$ = 4 lbs. to the square inch.
$A$ = 122.7 square inches.
$L_a$ = 12.5 inches.
$B$ = 117.4 square inches.
$L_b$ = 11.5 inches.
$W$ = 80 pounds (computed).
$L_w$ = 9.19 inches (computed).

$$4 \times 122.7 \times 12.5 = 4 \times 117.4 \times 11.5 + 80 \times 9.19$$

$$6135 = 5400 + 735 = 6135.$$

A valve having the dimensions and weight given above would remain seated until the differential pressure reached four pounds to the square inch when all of the forces mentioned above acting on the valve would be balanced and a slight increase in differential pressure would move the valve from its seats.

With the opening of the valve a new force, resulting from the stream of water flowing through the main line channel and impinging on the inlet side of the vertical flap, is added. This force increases with the flow and swings the valve to the full open position as in ordinary single flap check valves.

It will be seen from the foregoing numerical example that in a check valve with a single vertical flap a force equal to the area $A$ of the flap multiplied by the differential pressure $P$, which equals 490.8 pounds, would be required to hold the valve against its seat until the required differential pressure was produced. With lever arms $L_a$ and $L_w$ of say 12.5 inches, a weight of 490.8 lbs. would be required. In valves heretofore constructed this force was obtained by means of counterweights, heavy spiral springs, or exposure of a portion of the valve seat area to atmospheric pressure.

Under reverse flow or "back pressure" the higher pressure would be in chamber 17$^a$ and the lower in chamber 15$^a$; the force tending to open the valve would be $PBL_b$ and the forces tending to close the valve would be $PAL_a$ and $WL_w$ from which it is apparent that the force tending to open the valve is less than the forces tending to close it so that any back flow would instantly close the valve which accordingly would remain closed and sealed under all back pressures.

In the form of the meter shown in Fig. 9, the inlet section 15 of the meter casing and the elements associated therewith are substantially the same as those illustrated in Fig. 1, and require no further description. In this form, however, the outlet section 17$^b$ of the meter casing is constructed with an arched portion 80$^b$ curved in an arc having the pivot 73$^a$ as a center, said pivot 73$^a$ corresponding to the rod 73 of the form illustrated in Fig. 1. The interior of the arched portion 80$^b$ constitutes a compartment 80$^c$ corresponding to the compartment 80$^a$ of Fig. 1 and communicating with the interior of a throat-piece 21$^b$ by means of an outwardly directed passage 23$^b$, it being understood that the throat-piece 21$^b$ is provided with by-pass channels 22$^b$ corresponding to the by-pass channels 22 of Fig. 1 and likewise establishing communication between the passage 23 of the section 15 and the outlet chamber 17$^c$ of the section 17$^b$. The one end of the throat-piece 21$^b$ is formed with a valve seat 24$^a$ corresponding to the valve seat 24 of Fig. 1 and adapted for engagement by a flap member 68$^a$ similar to the flap member 68 and likewise forming part of a duplex valve in the form of the meter under discussion, which duplex valve is mounted to swing about the pivot 73$^a$ which may comprise a rod similar to the rod 73 of the form first described. The duplex valve further includes a second flap member 69$^a$ corresponding to the flap member 69 of Fig. 1 and combined with the flap member 68$^a$ by means of a carrier 70$^a$ similar to the carrier 70. The flap member 69$^a$ as shown in Fig. 9 co-operates with a valve seat 76$^a$ corresponding to the valve seat 76 and likewise formed in a valve ring 77$^a$ which includes a flange portion screwthreaded into the arched portion 80$^b$ so as to be adjustable therein relatively to said flap member 69$^a$. In the form now being described the flap member 69$^a$ controls the communication between the compartment 80$^c$ and a compartment 17$^d$ formed in an extension 17$^e$ projecting upwardly from the section 17$^b$ and closed at its upper end by a hood 80$^d$ similar to the hood 80 and fixed upon the extension 17$^e$ in any convenient manner as by means of bolts 81$^a$.

The operation of the form of meter illustrated in Fig. 9 is substantially the same as the one previously described and will be apparent from the description hereinbefore.

In operation, when the flow through the meter is just sufficient to create the required differential pressure to start the valve in motion, said valve opens suddenly and assumes a position in which the oblique face of the washer 68$^b$ is in approximate alignment with the outlet end of the throat-piece 21$^b$; a similar operation is effected in the flap member 69$^a$ which is made of slightly less diameter than the inner diameter of the screwthreaded flange portion of the valve ring 77$^a$ as shown in Fig. 9.

The weight of the valve is just sufficient to close it when the flow is reduced or stopped, and since, when the valve swings from its seats the moments about the pivot 73$^a$ are substantially the same for any position of the valve, only a slight force resulting from impingement of the flowing water through the main line channel, is required to swing the valve to the fully open position.

In this form of valve the parts should be so proportioned that the flow through the by-pass channels 22$^b$ or their equivalent will be large enough under a four pound pressure drop between the inlet chamber 15$^a$ and the outlet chamber 17$^c$ in Fig. 9 or the equivalent chambers in Fig. 1, at the outlets of the by-pass channels 22$^b$ in Fig. 9, or 22 in Fig. 1, to produce sufficient flow through said by-pass channels to actuate the meter.

From the foregoing description it is clear that the novel features set forth enable a meter of the fire-service type to be constructed in which a single measuring piston serves to accurately measure all flows passing through the particular meter in question; it is further apparent that the construction of the meter is simple and durable and extremely efficient and accurate in action. It will be understood that while the duplex valve in its various forms as shown herein is particularly adapted for use in water meters, it is not limited to such use and may be readily adapted for other purposes.

The novel water meter possessing the characteristics set forth herein is particularly suitable for measuring the supply of water where only one supply line is provided for both fire protection and industrial use and further is suitable for use as a master meter for measuring the total supply of water delivered to a town or other water district. When thus used the meter overcomes measurement inaccuracies in existing types of meters occurring in such meters particularly at that point at which the valve begins to open and permitting some water to flow through the meter without registration; the novel meter avoids this possibility and guarantees accurate measurements under all conditions particularly in cases where the water is used for prolonged periods at rates where the valve begins to initially open.

Various changes in the specific forms shown and described may be made within the scope of the claims without departing from the spirit of the invention.

I claim:

1. In a water meter, the combination of a casing provided with connected inlet and outlet chambers constituting an internal main line channel, movable valve means for controlling the flow through said main line channel, by-pass means leading from said inlet chamber to said outlet chamber, a measuring chamber in said by-pass means, operating means in said measuring chamber actuated by the flow therethrough, a rotatable friction disc operated by said operating means, a totalizer including a friction wheel operated by said friction disc to register the flow through said by-pass means, a second movable totalizer including a second friction wheel in engagement with said friction disc, and means controlled by the movements of said valve means to adjust said second totalizer and shift said second friction wheel relatively to said friction disc in accordance with the position of said valve means whereby said second totalizer co-operates with said first totalizer to register the total flow through said meter.

2. In a water meter including a casing provided with connected inlet and outlet chambers constituting an internal main line channel, movable valve means for controlling the flow through said main line channel, and by-pass means leading from said inlet chamber to said outlet chamber, that improvement which comprises a measuring chamber in said by-pass means, operating means in said measuring chamber actuated by the flow therethrough, a totalizer casing in operative relation to said measuring chamber, a rotatable friction disc in said totalizer casing operated by said operating means, guide rods fixed in said totalizer casing, a first carriage adjustably secured on said guide rods, a first totalizer supported upon said first carriage and including a friction wheel operated by said friction disc to register the flow through said by-pass means, a second carriage slidably mounted on said guide rods, a second totalizer supported upon said second carriage and including a second friction wheel in engagement with said friction disc, and means controlled by the movements of said valve means to slidably adjust said second carriage and shift said second friction wheel relatively to said friction disc in accordance with the position of said valve means whereby said second totalizer co-operates with said first totalizer to register the total flow through said meter.

3. In a water meter including a casing provided with connected inlet and outlet chambers constituting an internal main line channel, movable valve means for controlling the flow through said main line channel, and by-pass means leading from said inlet chamber to said outlet chamber, that improvement which comprises a measuring chamber in said by-pass means, operating means in said measuring chamber actuated by the flow therethrough, a totalizer casing in operative relation to said measuring chamber, a rotatable friction disc in said totalizer casing operated by said operating means, guide rods fixed in said totalizer casing, a first carriage adjustably mounted on said guide rods, a first totalizer pivotally supported upon said first carriage and including a friction wheel operated by said friction disc to register the flow through said by-pass means, a second carriage slidably mounted on said guide rods, a second totalizer pivotally supported upon said second carriage and including a second friction wheel in engagement with said friction disc, springs effective on said pivoted totalizers for yieldingly maintaining said friction wheels in operative contact with said friction disc, and means controlled by the movements of said valve means to slidably adjust said second carriage and shift said second friction wheel relatively to said friction disc in accordance with the position of said valve means whereby said second totalizer co-operates with said first totalizer to register the total flow through said meter.

EDWARD NUEBLING.